(12) United States Patent  
Kulavik

(10) Patent No.: US 10,441,888 B2  
(45) Date of Patent: *Oct. 15, 2019

(54) DYNAMIC ADJUSTMENT OF GAME CONTROLLER SENSITIVITY BASED ON AUDIO ANALYSIS

(71) Applicant: Voyetra Turtle Beach, Inc., Valhalla, NY (US)

(72) Inventor: Richard Kulavik, San Jose, CA (US)

(73) Assignee: Voyetra Turtle Beach, Inc., Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,781

(22) Filed: Oct. 16, 2018

(65) Prior Publication Data

US 2019/0046881 A1  Feb. 14, 2019

Related U.S. Application Data

(63) Continuation of application No. 15/412,360, filed on Jan. 23, 2017, now Pat. No. 10,105,602, which is a
(Continued)

(51) Int. Cl.
*A63F 13/424* (2014.01)
*A63F 13/54* (2014.01)
(Continued)

(52) U.S. Cl.
CPC ............. *A63F 13/54* (2014.09); *A63F 13/215* (2014.09); *A63F 13/22* (2014.09); *A63F 13/25* (2014.09);
(Continued)

(58) Field of Classification Search
CPC . A63F 2300/1018; A63F 13/428; A63F 13/06
See application file for complete search history.

(56) References Cited

U.S. PATENT DOCUMENTS 6,053,814 A   4/2000 Pchenitchnikov
6,614,912 B1  9/2003 Yamada et al.
(Continued)

FOREIGN PATENT DOCUMENTS

WO   2012/172480 A2   12/2012

OTHER PUBLICATIONS

PCT International Preliminary Report dated Apr. 21, 2016 for PCT Patent Application No. PCT/US2014/054060.
(Continued)

*Primary Examiner* — Reginald A Renwick
(74) *Attorney, Agent, or Firm* — McAndrews, Held & Malloy

(57) ABSTRACT

An electronic device may receive a plurality of channels of game and/or chat audio during play of a game. The electronic device may detect one or more sounds on one or more of the audio channels during the monitoring of the plurality of audio channels. The electronic device may control, based on the detected one or more sounds, operation of a game controller that interacts with the game during play. The controlling of the operation of the game controller may comprise adjusting sensitivity of the game controller. The electronic device may determine directionality of the detected one or more sounds and adjust the sensitivity of the game controller based on the determined directionality of the detected one or more sounds. The electronic device may increase and/or decrease the sensitivity of the game controller in response to changes in the determined directionality of the detected one or more sounds.

40 Claims, 12 Drawing Sheets

Related U.S. Application Data continuation of application No. 14/658,413, filed on Mar. 16, 2015, now Pat. No. 9,550,113, which is a continuation of application No. 14/331,512, filed on Jul. 15, 2014, now Pat. No. 8,979,658.

(60) Provisional application No. 61/889,102, filed on Oct. 10, 2013.

(51) Int. Cl.

| | | |
|---|---|---|
| H04R 5/033 | (2006.01) | |
| A63F 13/22 | (2014.01) | |
| A63F 13/327 | (2014.01) | |
| A63F 13/98 | (2014.01) | |
| A63F 13/215 | (2014.01) | |
| G06F 3/0481 | (2013.01) | |
| G06F 3/0338 | (2013.01) | |
| G06F 3/038 | (2013.01) | |
| A63F 13/25 | (2014.01) | |
| A63F 13/31 | (2014.01) | |
| H04R 1/10 | (2006.01) | |

(52) U.S. Cl.
CPC ............ *A63F 13/31* (2014.09); *A63F 13/327* (2014.09); *A63F 13/424* (2014.09); *A63F 13/98* (2014.09); *G06F 3/038* (2013.01); *G06F 3/0338* (2013.01); *G06F 3/0481* (2013.01); *H04R 5/033* (2013.01); *H04R 1/1041* (2013.01)

(56) References Cited

U.S. PATENT DOCUMENTS

| 7,136,712 | B2 | 11/2006 | Mizumura et al. |
|---|---|---|---|
| 7,976,385 | B2 | 7/2011 | Riggs |
| 9,067,135 | B2 | 6/2015 | Kulavik |
| 10,105,602 | B2 * | 10/2018 | Kulavik ................ A63F 13/215 |
| 2002/0094865 | A1 | 7/2002 | Araki et al. |
| 2002/0161586 | A1 | 10/2002 | Wang |
| 2003/0007648 | A1 | 1/2003 | Currell |
| 2004/0136538 | A1 | 7/2004 | Cohen et al. |
| 2005/0117761 | A1 | 6/2005 | Sato |
| 2006/0120533 | A1 | 6/2006 | Chen |
| 2008/0009332 | A1 | 1/2008 | Kake |
| 2008/0240458 | A1 | 10/2008 | Goldstein et al. |
| 2008/0318518 | A1 | 12/2008 | Coutinho et al. |
| 2009/0147975 | A1 | 6/2009 | Horbach et al. |
| 2009/0232317 | A1 | 9/2009 | Emerit et al. |
| 2009/0252337 | A1 | 10/2009 | Chen et al. |
| 2009/0252355 | A1 | 10/2009 | Mao |
| 2009/0304214 | A1 | 12/2009 | Xiang et al. |
| 2010/0040240 | A1 | 2/2010 | Bonanno |
| 2011/0135098 | A1 | 6/2011 | Kuhr et al. |
| 2012/0014553 | A1 | 1/2012 | Bonanno |
| 2012/0213375 | A1 | 8/2012 | Mahabub et al. |
| 2013/0041648 | A1 | 2/2013 | Osman |
| 2014/0073429 | A1 | 3/2014 | Meneses et al. |
| 2014/0133683 | A1 | 5/2014 | Robinson et al. |
| 2015/0098575 | A1 | 4/2015 | Kulavik et al. |
| 2015/0098597 | A1 | 4/2015 | Kulavik |
| 2015/0098603 | A1 | 4/2015 | Kulavik et al. |

OTHER PUBLICATIONS

Int'l Search Report and Written Opinion for PCT/US14/54060 dated Dec. 18, 2014.
Int'l Search Report and Written Opinion for PCT/US2014/059691 dated Jan. 7, 2015.
Int'l Search Report and Written Opinion for PCT/US2014/049687 dated Nov. 18, 2014.

* cited by examiner

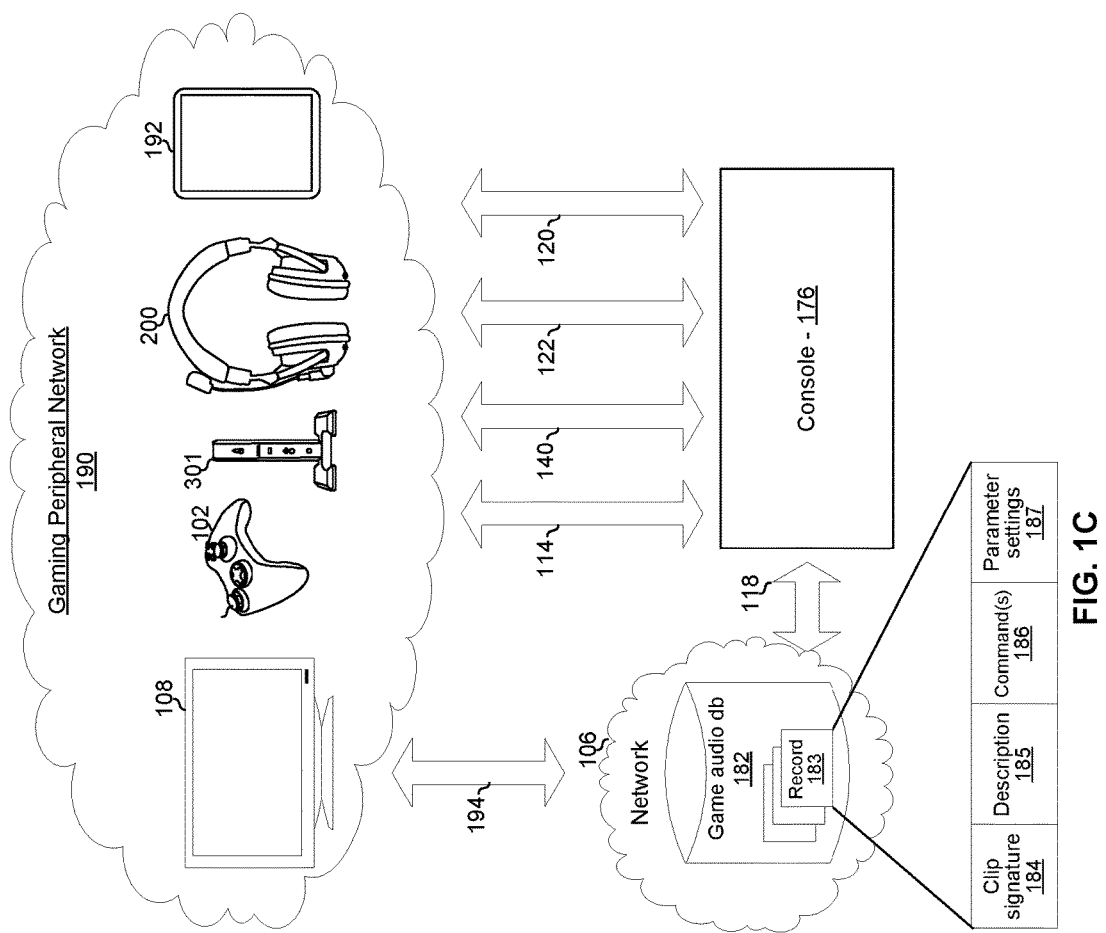

DYNAMIC ADJUSTMENT OF GAME CONTROLLER SENSITIVITY BASED ON AUDIO ANALYSIS

PRIORITY CLAIM

This patent application is a continuation of U.S. application Ser. No. 15/412,360 filed on Jan. 23, 2017, which is a continuation of U.S. application Ser. No. 14/658,413 filed on Mar. 16, 2015, now U.S. Pat. No. 9,550,113, which is a continuation of U.S. patent application Ser. No. 14/331,512 filed Jul. 15, 2014, now U.S. Pat. No. 8,979,658, which in turn, claims priority to and the benefit of U.S. provisional patent application 61/889,102 filed on Oct. 10, 2013. Each of the above reference documents is hereby incorporated herein by reference in its entirety.

INCORPORATION BY REFERENCE

Each of the following applications is hereby incorporated herein by reference in its entirety:
U.S. patent application Ser. No. 13/040,144 titled "Gaming Headset with Programmable Audio" and published as US2012/0014553; and
U.S. provisional patent application 61/878,728 titled "Multi-Device Gaming Interface" filed on Sep. 17, 2013.

TECHNICAL FIELD

Aspects of the present application relate to electronic gaming. More specifically, to methods and systems for dynamic adjustment of game controller sensitivity based on audio analysis.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for dynamic control of game controller sensitivity based on audio analysis, substantially as illustrated by and/or described in connection with at least one of the figures, as set forth more completely in the claims.

BRIEF DESCRIPTION OF THE DRAWINGS

FIG. 1C is a diagram of an exemplary gaming console and an associated network of peripheral devices, in accordance with various exemplary embodiments of the disclosure.

DETAILED DESCRIPTION

Certain embodiments of the disclosure may be found in a method and system for dynamic control of game controller sensitivity based on audio analysis. In accordance with various embodiments of the disclosure, an electronic device, such as an audio headset and/or audio basestation, may receive a plurality of channels of game and/or chat audio during play of a game. The electronic device may detect one or more sounds on one or more of the audio channels during the monitoring of the plurality of audio channels. The electronic device may control, based on the detected one or more sounds, operation of a game controller that interacts with the game during play. The controlling of the operation of the game controller may comprise adjusting sensitivity of the game controller. The electronic device may determine directionality of the detected one or more sounds and adjust the sensitivity of the game controller based on the determined directionality of the detected one or more sounds. The electronic device may increase and/or decrease the sensitivity of the game controller in response to changes in the determined directionality of the detected one or more sounds. The electronic device may perform signal analysis on the plurality of channels. The electronic device may determine characteristics of the detected one or more sounds based on the signal analysis. The electronic device may adjust the sensitivity of the game controller based on the determined characteristics of the detected one or more sounds. The electronic device may increase and/or decrease the sensitivity of the game controller in response to changes in the determined characteristics of the detected one or more sounds. The electronic device may perform the increase and/or decrease of the sensitivity of the game controller dynamically (e.g., during game play while concurrently processing audio) and/or adaptively (e.g., based on feedback such as from the game controller and/or the game console on which the game is being played).

Figure 1A:
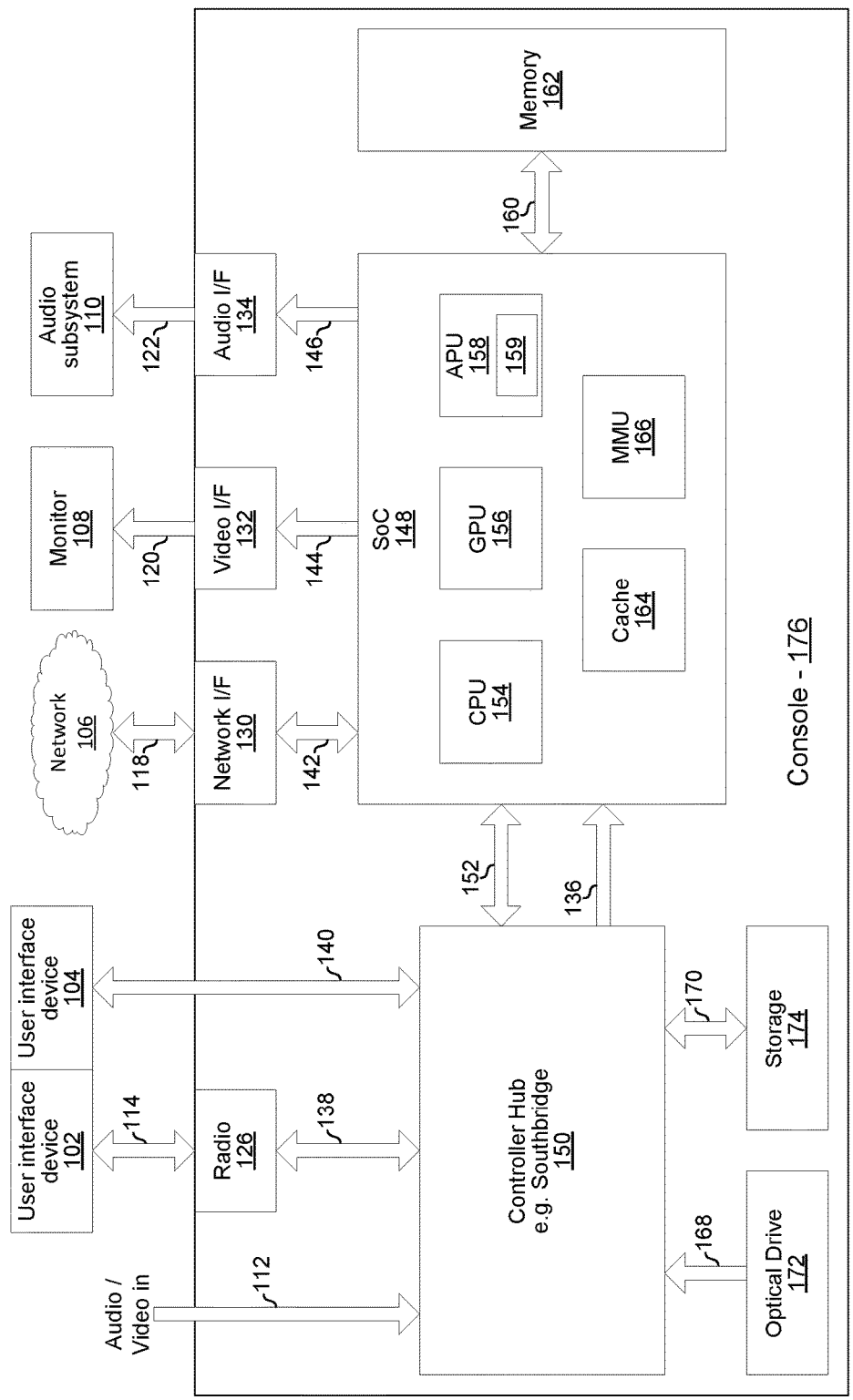
FIG. 1A is a diagram that depicts an example gaming console, which may be utilized to provide dynamic control of game controller sensitivity based on audio analysis, in accordance with various exemplary embodiments of the disclosure.

FIG. 1A depicts an example gaming console, which may be utilized to provide dynamic control of game controller sensitivity based on audio analysis, in accordance with various exemplary embodiment of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 136, 138, 142, 144, 146, 152, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the console and/or part of one or more software applications running on the console.

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the audio subsystem 110 via link(s) 122 (e.g., S/PDIF for digital audio or "line out" for analog audio). Additional details of an example audio subsystem 110 are described below.

Figure 1B:
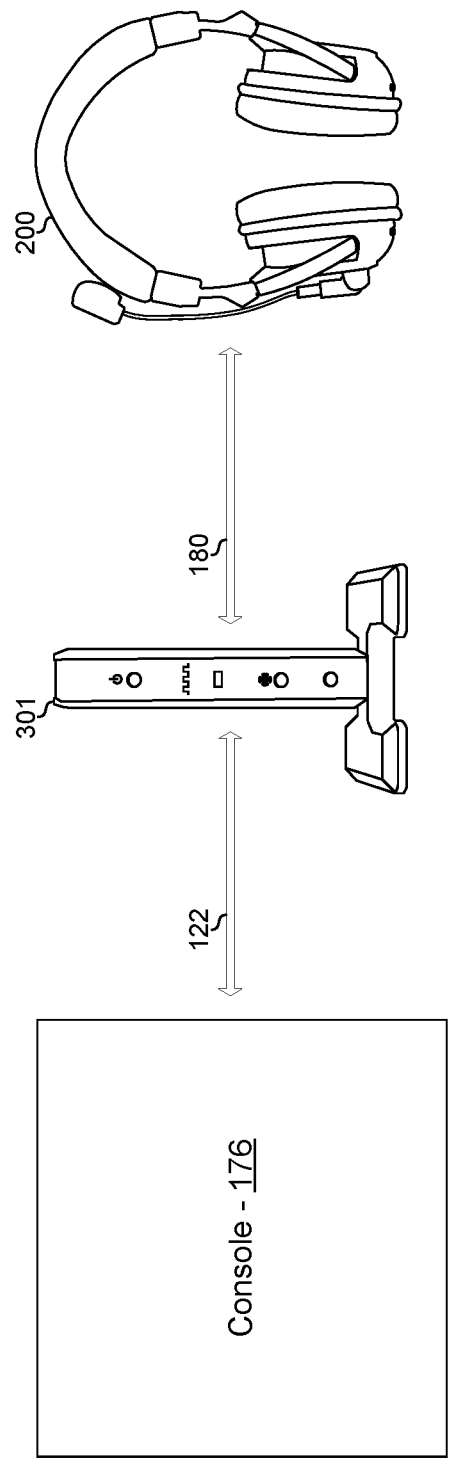
FIG. 1B is a diagram that depicts an example gaming audio subsystem comprising a headset and an audio basestation, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience. Examples of such interactions between the device 192 and the other devices of the GPN 190 are described in above incorporated U.S. provisional patent application 61/878,728 titled "Multi-Device Gaming Interface.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprints") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

In instances where the user interface device 102 comprises a game controller that is operable to control game play, the sensitivity of the user interface device 102 may be controlled based on sounds that are detected during the game play. In this regard, the headset 200 may be operable to monitor a plurality of channels of game and/or chat audio and detect the sounds during game play. Based on the characteristics of the detected sounds, the headset 200 may be operable to control the sensitivity of the game controller. As sensitivity increases, the same amount of movement of a joystick or D-pad of the controller results in relatively larger or more rapid on-screen movements. Similarly, as sensitivity decreases, the same amount of movement of a joystick or D-pad of the controller results in relatively smaller or less rapid on-screen movements.

In some embodiments of the disclosure, the headset 200 may be operable to communicate directly with the game controller via, for example, a wireless communication link. In this regard, the headset 200 may be operable to communicate information that is used to control the sensitivity over the game controller over the wireless communication link. In some embodiments of the disclosure, the headset 200 may be operable to communicate indirectly with the game controller via the console 176. In this regard, the headset 200 may be operable to communicate information that is used to control the sensitivity over the game controller to the console 176 and the console 176 may utilize that information to control the game controller and/or control its response to inputs from the game controller. In some embodiments of the disclosure, the console 176 may communicate the information that is received from the headset 200 to the game controller, and the game controller may utilize the received information to control its sensitivity. The communication link between the headset 200 and the game console 176 may comprise a wired and/or wireless communication link and the communication link between the game console 176 and the game controller may comprise a wired and/or wireless communication link.

In some embodiments of the disclosure, the basestation 300 (FIG. 1B) may be operable to provide connectivity between the headset 200, the console 176 and the user interface device 102, which may comprise a game controller. In this regard, the basestation 300 may be operable to communicate game controller sensitivity information from the game headset to the user interface device 102, which may comprise a game controller.

Figure 2A:
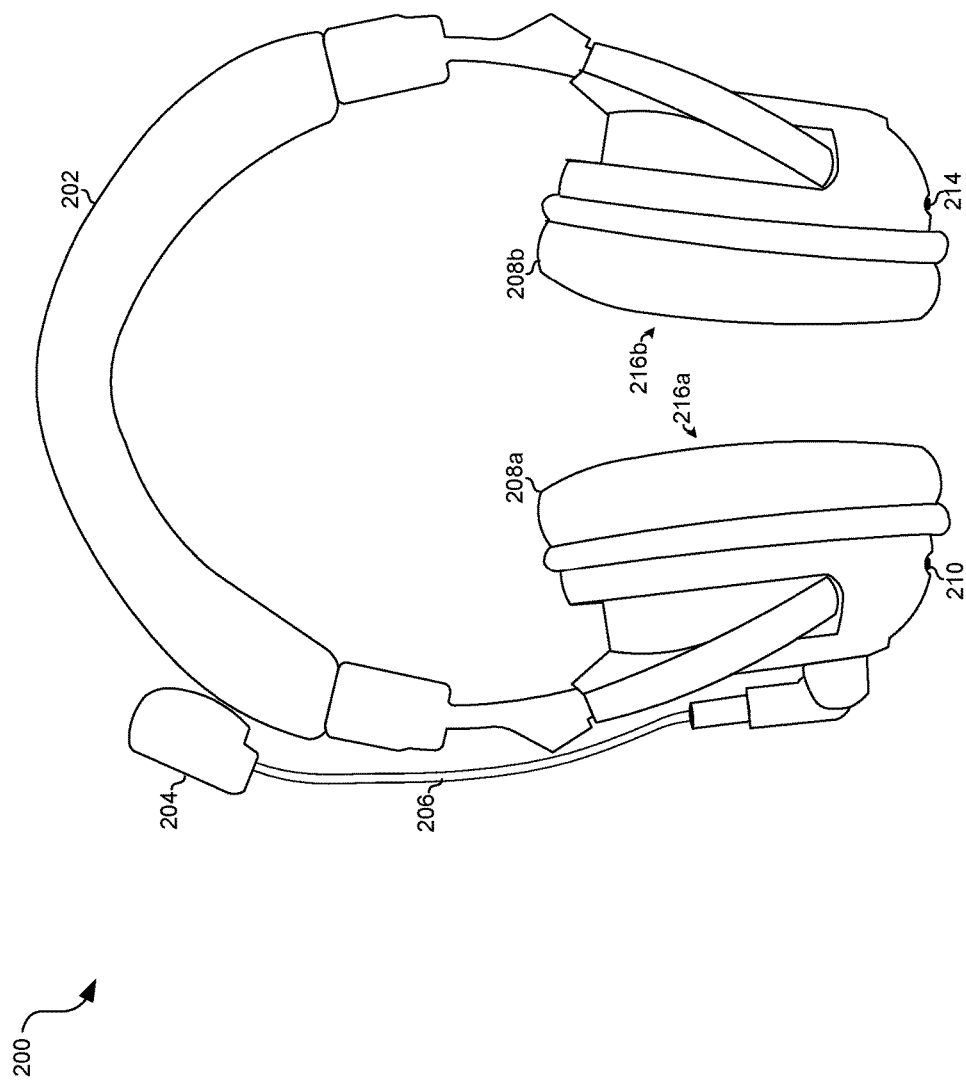
FIGS. 2A and 2B are diagrams that depict two views of an example embodiment of a gaming headset, in accordance with various exemplary embodiments of the disclosure.
Figure 2B:
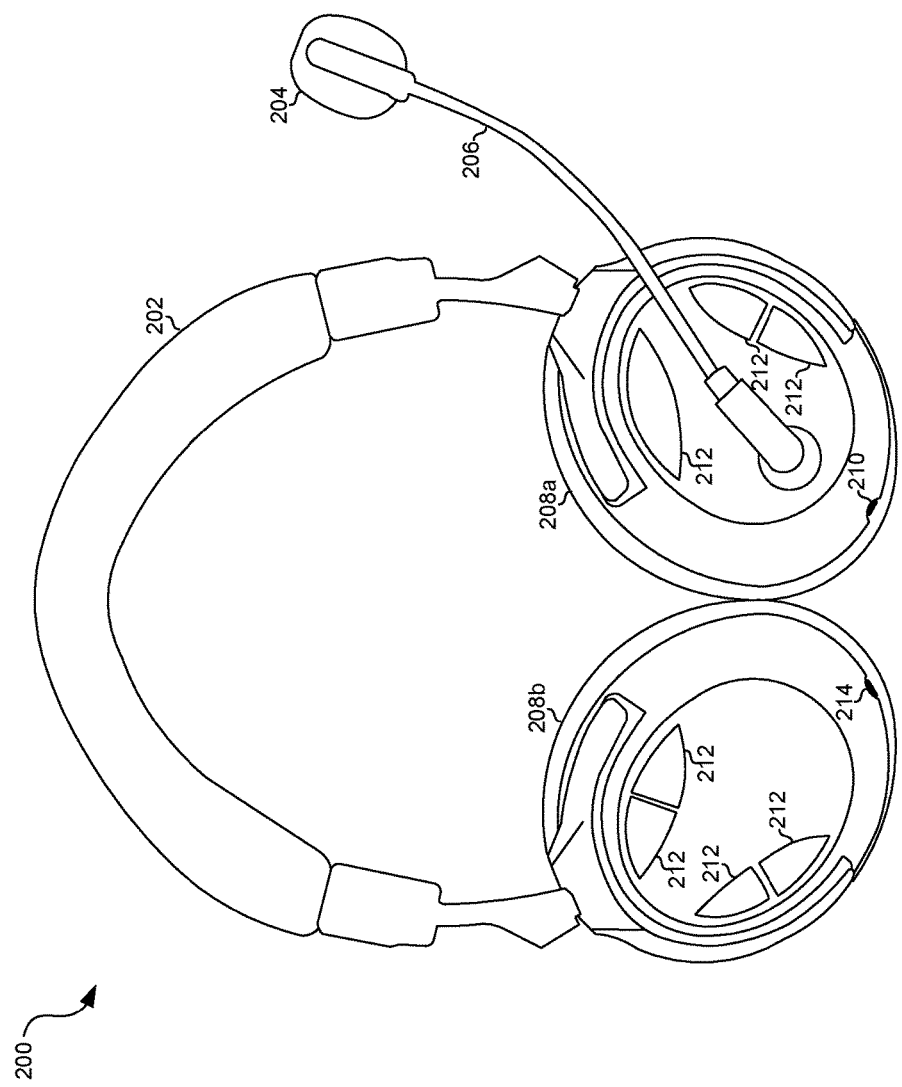

FIGS. 2A and 2B are diagrams that depict two views of an example embodiment of a gaming headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216a and 216b may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engage in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
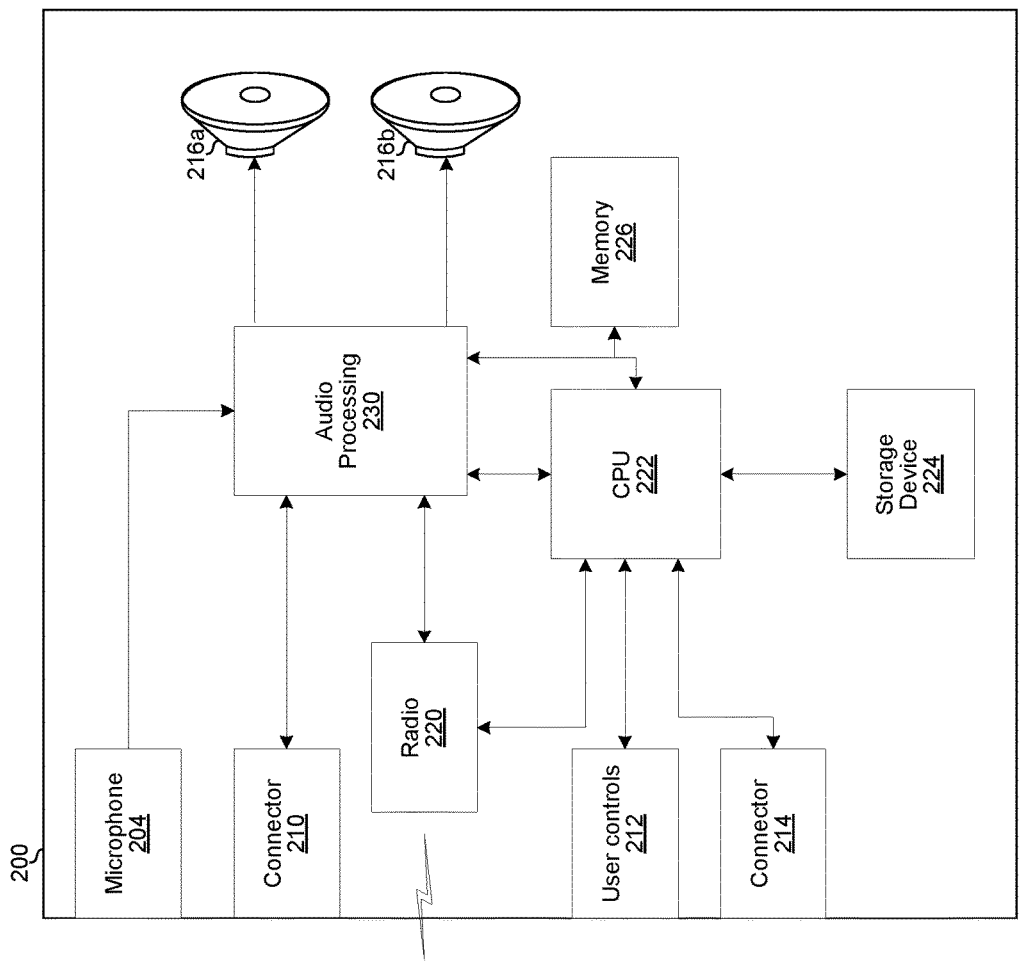
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle dynamic control of game controller sensitivity based on audio analysis of a plurality of audio channels. In this regard, the CPU 222 may be operable to dynamically and/or adaptively handle the adjustment of the sensitivity of one or more of the user interface devices 102, 104 such as a game controller based on audio detected on one or more of a plurality of monitored audio channels and/or based on audio information, which may be stored in the storage device 224 and/or the memory 226. The audio information may include information such as is stored in the database 182 of FIG. 1C. Characteristics of detected sounds may, for example, be input to a look-up table for a particular game to identify the particular sounds and, once the sounds are identified, a database record 183 corresponding to that sound may be accessed to, for example, determine controller sensitivity suited for interacting with a source of the sound.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store audio information corresponding to a plurality of audio channels for a game play. The audio information may be utilized to control sensitivity of one or more of the user interface devices 102, 104 such as a game controller. In one embodiment of the disclosure, the headset 200 may be operable to download the audio information for a particular game from a server and store the downloaded audio information in the storage device 224. In this regard, the CPU 222 may be operable to configure the radio 220 to download the audio information for a particular game.

In an embodiment of the disclosure, the CPU 222 may be operable to configure the audio processing circuit 230 to perform signal analysis on the plurality of audio channels that are received via the connector 210 and/or the radio 220. The CPU 222 may be operable to control the operation of the audio processing circuit 230 in order to store the results of the audio analysis along with an identifier of the game in the storage device 224 and/or upload the results to an online location such as the database 182 of FIG. 1C. The audio analysis may be executed the first time that the game is played using the headset 200. The stored results of the audio analysis may be utilized by the headset 200 to control sensitivity of one or more of the user interface devices 102, 104 such as a game controller.

The memory 226 may comprise suitable logic, circuitry, interfaces and/or code that may comprise volatile memory used by the CPU 222 and/or audio processing circuit 230 as program memory, for storing runtime data, etc. In this regard, the memory 226 may comprise information and/or data that may be utilized to control operation of the audio processing circuit 230 to perform signal analysis on the plurality of received audio channels. The memory 226 may comprise information and/or data that may be utilized by the headset 200 to control sensitivity of one or more of the user interface devices 102, 104 such as a game controller.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216a and 216b. Additionally, or alternatively, the processing may be performed on chat audio that is subsequently output to the connector 210 and/or radio 220.

The audio processing circuit 230 may be operable to perform signal analysis on the received channels of game and/or chat audio. In this regard, the audio processing circuit 230 may be operable to analyze the audio on each of the plurality of received audio channels in order to determine, for example, directionality of one or more detected sounds. Directionality of a particular sound may be determine by, for example: which surround channel(s) the sound is currently detected on, which surround channel(s) the sound was previously detected on, a current intensity of the sound, and/or a previous intensity of the sound. Based on the analysis, the audio processing circuit 230 may be operable to increase or decrease the sensitivity of one or more of the user interface devices 102, 104 such as a game controller. For example, if the audio analysis determines that the detected sounds may be coming from the rear of the listener's game character, then the headset 200 may be operable to increase the sensitivity of the game controller so that the game controller becomes highly sensitive and may be utilized to rapidly spin the listener's game character in the direction of the detected sounds. When the audio processing circuit 230 determines that the detected sounds have moved to the center channel, the headset 200 may be operable to decrease the sensitivity of the game controller so the listener's game character may be maneuvered to a position where it may precisely interact with the source of the sounds.

In an exemplary operation of the disclosure, the CPU 222 may be operable to control the audio processing circuit 230 to detect sounds on one or more monitored audio channels for a game during game play. The CPU 222 may be operable to configure the headset 200 to control operation of one or more of the user interface devices 102, 104 such as a game controller based on characteristics of the detected sounds. In this regard, the headset 200 may be operable to analyze the sounds that are detected on one or more of the monitored audio channels and may determine the directionality of the detected sounds. Based on the determined directionality, the CPU 222 may control the headset 200 to generate one or more signals for adjusting the sensitivity of the one or more of the user interface devices 102, 104 such as a game controller by dynamically and/or adaptively increasing or decreasing the sensitivity of the game controller. The CPU 222 may also be operable to obtain stored audio information for the game from the storage device 224. In this regard, the CPU 222 may detect or determine the identity of the game and may obtain or load the corresponding stored audio information for the detected or determined game from the storage device 224 and/or from an online source such as database 182. The stored audio information may also be utilized by the headset 200 to control operation of the one or more of the user interface devices 102, 104 such as a game controller.

Figure 3A:
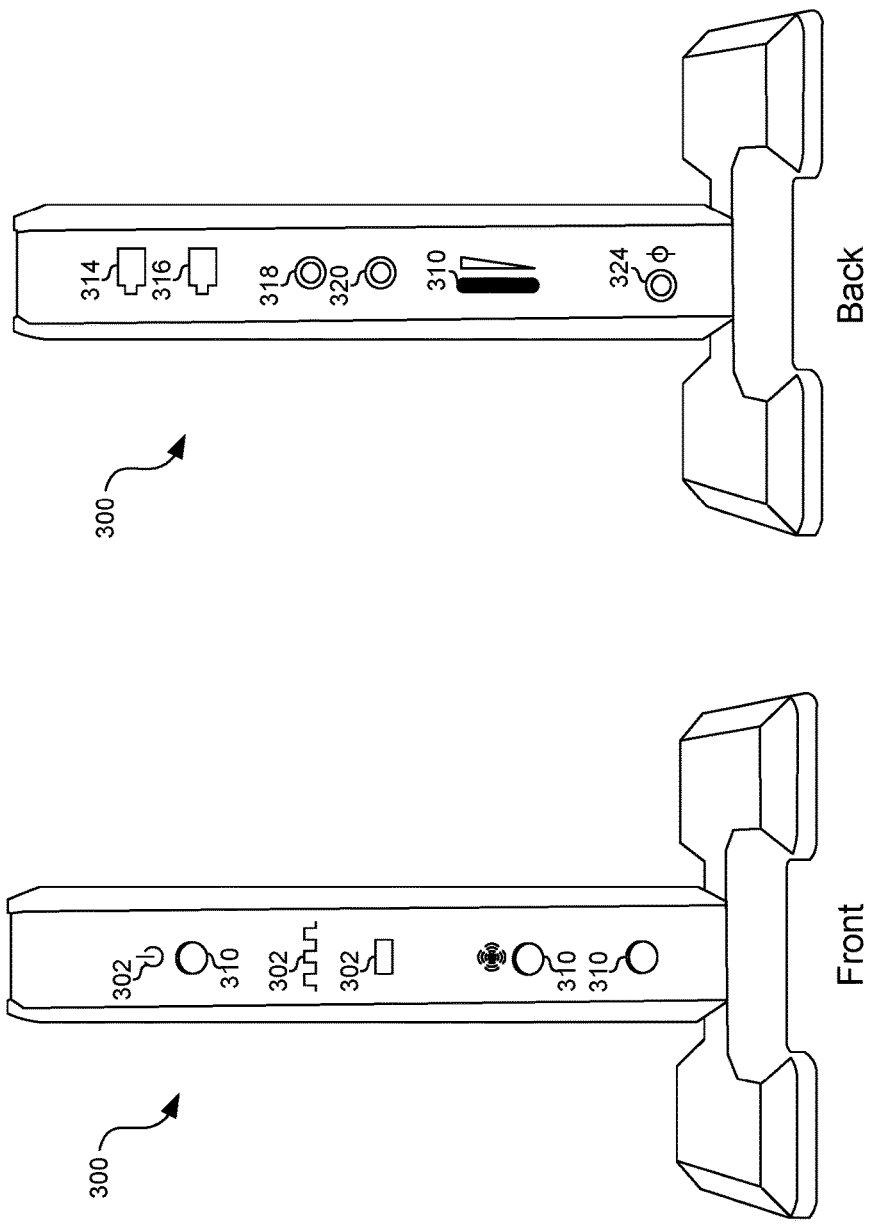
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
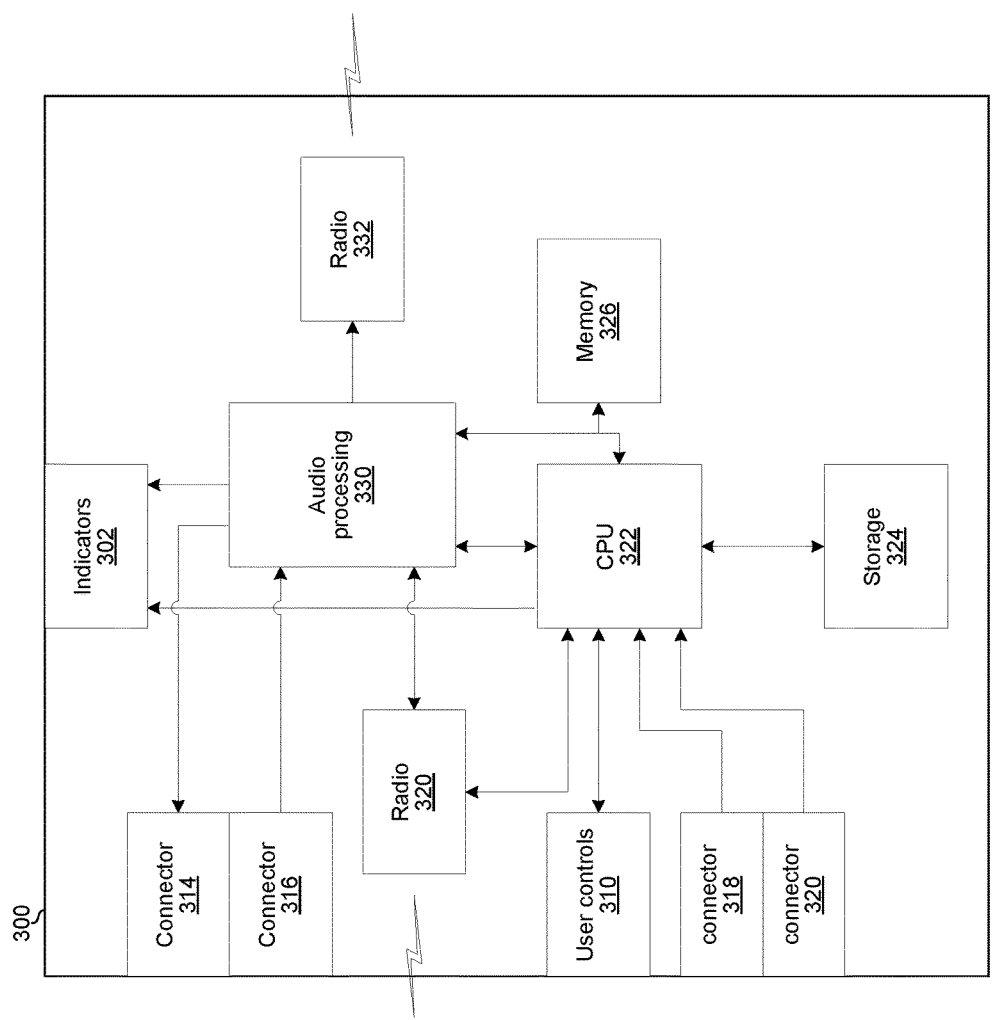
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 301. For example, one or more parameter settings may determine, at least in part, a gain of one or more gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
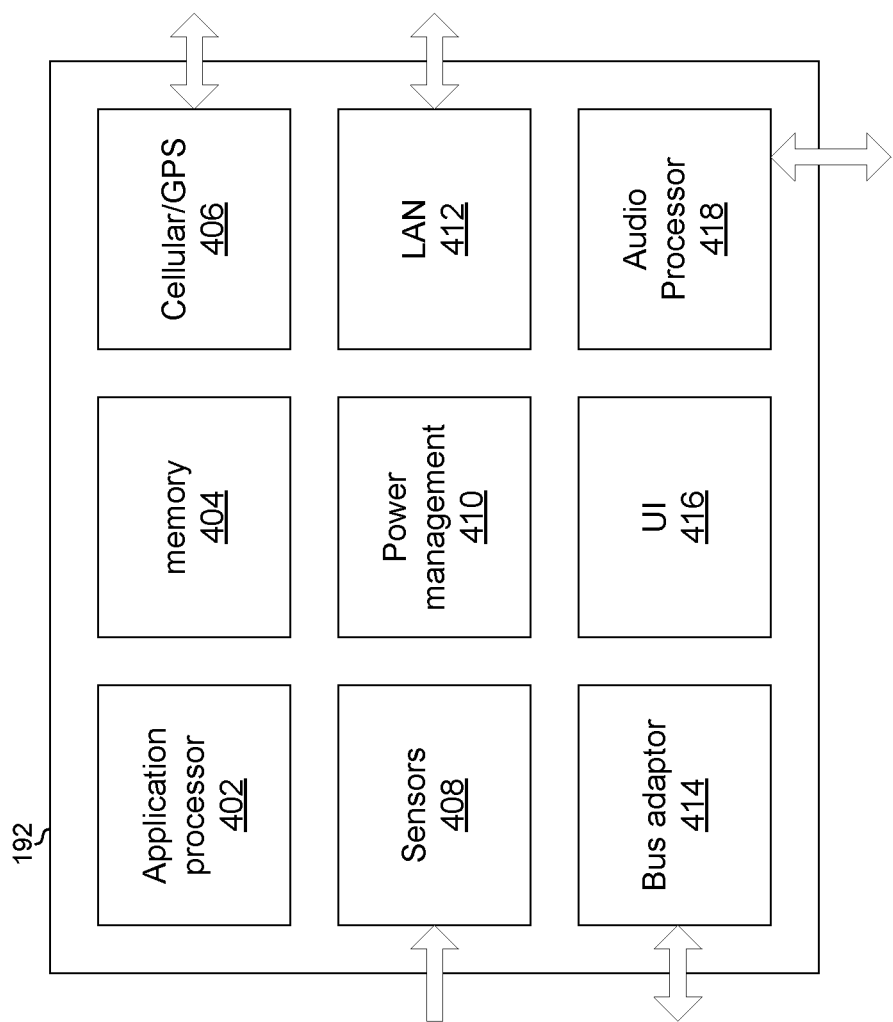
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
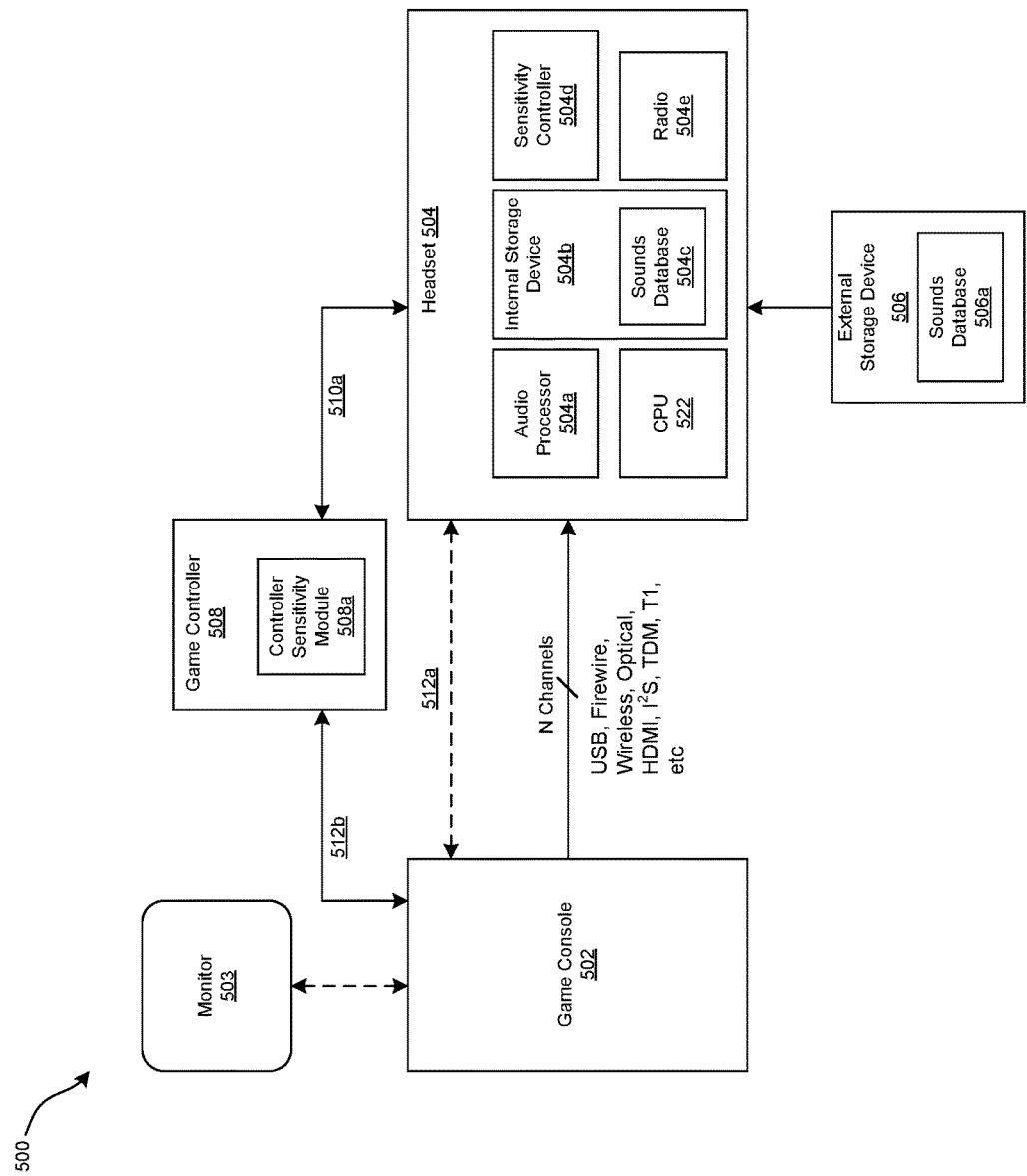
FIG. 5 is a block diagram illustrating an exemplary subsystem that may be utilized for adjusting game controller sensitivity during game play, in accordance with an embodiment of the disclosure.

FIG. 5 is a block diagram illustrating an exemplary subsystem that may be utilized for adjusting game controller sensitivity during game play, in accordance with an embodiment of the disclosure. Referring to FIG. 5, there is shown a game console 502, a monitor 503, a headset 504, an external storage device 506, and a game controller 508. The headset 504 may comprise an audio processor 504a, an internal storage device 504b, a sensitivity controller 504d, a radio 504e and a CPU 522. The internal storage device 504b may comprise a sounds database 504c. The external storage device 506 may comprise a sounds database 506a. The game controller 508 may comprise a controller sensitivity module 508a.

The game console 502 may comprise suitable logic, circuitry, interfaces and/or code that may be operable to present a game to, and also enable game play interaction between, one or more local players and/or one or more remote players. The game console 502 may be substantially similar to the game console 176, which is shown and described with respect to FIG. 1A. The game console 502 may be operable to generate output video signals for a game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel. The video generated from the game console 502 during game play may be communicated to the monitor 503 to be displayed by the monitor 503. In some embodiments of the disclosure, the game console 502 may be operable to adjust sensitivity of the game controller 508 for a game being played on the console 502 and displayed on the monitor 503. In some embodiments of the disclosure, the game console 502 may be operable to receive game controller sensitivity information from the headset 504 and communicate the received game controller sensitivity information for the game play to the game controller 508.

The monitor 503 may comprise suitable logic, circuitry, interfaces and/or code that may be operable to display corresponding audio and video that may be received from the game console 502 for the game during game play. The monitor 503 may comprise a television (TV), computer monitor, laptop display, and so on.

The headset 504 may comprise suitable logic, circuitry, interfaces and/or code that may be operable to receive the plurality of channels of game and/or chat audio. The headset 504 may be substantially similar to the headset 200, which is shown and described with respect to FIGS. 2A, 2B and 2C. The headset 504 may be operable to monitor and analyze the audio in order to determine characteristics of the sounds on the monitored channels and adjust sensitivity of the game controller 508 based on the determined characteristics of the audio. Exemplary characteristics may comprise directionality, pitch, tone, frequency of occurrence and/or intensity.

The external storage device 506 may comprise one or more suitable devices having suitable logic, circuitry, interfaces and/or code that may be operable to store audio information and/or game controller sensitivity information for a game. The audio information and/or game controller sensitivity information may be stored in, for example, the sounds database 506a. The audio information and/or game controller sensitivity information may be utilized to control sensitivity of the game controller 508 based on characteristics of the analyzed audio signals. The stored audio information and/or game controller sensitivity information in the sounds database 506a may be transferred from the external storage device 506 to the sounds database 504c in the internal storage device 504b and be utilized to control sensitivity of the game controller 508 during game play.

The audio processor 504a may comprise suitable logic, circuitry, interfaces and/or code that may be operable to monitor the plurality of channels of game and/or chat audio. The audio processor 504a may be substantially similar to the audio processing circuit 230, which is shown and described with respect to FIG. 1A. The audio processor 504a may be operable to utilize signal analysis to determine the characteristics of sounds in the monitored plurality of audio channels. In instances when the audio processor 504a detects certain sounds and/or characteristics, the audio processor 504a may be operable to cause the sensitivity controller 504d to communicate game controller sensitivity information to the controller sensitivity module 508a. The game controller sensitivity information may be communicated via the link 510a, or via the links 512a and 512b. In some embodiments of the disclosure, the basestation 300 (FIG. 1B) may be operable to provide connectivity between the headset 504, the game console 502 and the game controller 508. In this regard, the basestation 300 may be operable to communicate game controller sensitivity information from the game headset 504 to the game controller 508.

The internal storage device 504b may comprise one or more suitable devices that may comprise suitable logic, circuitry, interfaces and/or code that may be operable to store audio information and/or game controller sensitivity information for a game. The internal storage device 504b may be substantially similar to the storage device 224, which is shown and described with respect to FIG. 2C. The audio information and/or game controller sensitivity information may be stored in, for example, the sounds database 504c. The audio information and/or game controller sensitivity information for a particular game may be downloaded from the sounds database 506a, which is in the external storage device 506, by the headset 504 via, for example, a wireless connection. The downloaded audio information and/or game controller sensitivity information may be stored in the sounds database 504c, which is in the internal storage device 504b. The audio information and/or game controller sensitivity information may be retrieved from the internal storage device 504b when a game is initiated.

The CPU 522 may comprise suitable logic, circuitry, interfaces and/or code that may be operable to execute instructions for controlling, managing and/or coordinating the overall operation of the headset 504. In this regard, the CPU 522 may be operable to control, manage and coordinate operation of the components in the headset 504, which comprises the audio processor 504a, the internal storage device 504b, the sensitivity controller 504d, the radio 504e and the sounds database 504c. The CPU 522 may also be operable to coordinate and manage operations between the headset 504, the game console 502, and the external storage device 506. The CPU 522 may also be operable to coordinate and manage operations for the sounds database 504c and the sounds database 506a. The CPU 522 may be substantially similar to the CPU 222, which is shown and described with respect to, for example, FIG. 2C. In an exemplary embodiment of the disclosure, the CPU 522 may be operable to control the headset 504 to adjust sensitivity of the game controller 508.

The sensitivity controller 504d may comprise suitable logic, circuitry, interfaces and/or code that may be operable to determine how the game controller 508 should be adjusted based on the characteristics of the sounds that are detected within the monitored channels by the audio processor 504a. The CPU 522 and/or the sensitivity controller 504d may be operable to utilize audio information and/or game controller sensitivity information that is stored in the sounds database 504c to determine how the sensitivity of the game controller should be adjusted. In accordance with an embodiment of the disclosure, the CPU 522 and/or the sensitivity controller 504d may be operable to utilize the determined characteristics of the detected sound to extract game controller sensitivity information from the sounds database 504c.

In an exemplary embodiment of the disclosure, in instances when the audio processor 504a detects sounds whose characteristics in the FR, C, and FL channels indicate that the source of the sounds is moving quickly across a field of vision of the listener's game character, the sensitivity controller 504d may be operable to generate game controller sensitivity information that may be communicated to the controller sensitivity module 508a. The game controller sensitivity module 508a may be operable to utilize the received game controller sensitivity information to increase the sensitivity of the game controller 508 so that the player can track the quick moving sound source. In some embodiments of the disclosure, as the characteristics of the detected sound changed based on the results of the audio analysis, the CPU 522 and/or the sensitivity controller 504d may be operable to dynamically and/or adaptively adjust the sensitivity of the game controller 508.

In an exemplary embodiment of the disclosure, in instances when the audio processor 504a detects sounds whose characteristics in the FR, C, and FL channels indicate that the source of the sounds is moving slowly across a field of vision of the listener's game character, the sensitivity controller 504d may be operable to generate game controller sensitivity information that may be communicated to the controller sensitivity module 508a. The game controller sensitivity module 508a may be operable to utilize the received game controller sensitivity information to decrease the sensitivity of the game controller 508 so that the player can precisely track the slow moving sound source.

The radio 504e may comprise suitable logic, circuitry interfaces and/or code that may be operable to communicate game controller sensitivity information between the headset 504 and the game console 502 and/or between the headset 504 and the game controller 508. The radio 504e may be substantially similar to the radio 220, which is shown and described with respect to, for example, FIG. 2C. In accordance with an embodiment of the disclosure, the headset 504 may be operable to utilize the radio 504e to communicate game controller sensitivity information from the sensitivity controller 504d to the game controller 508 via the communication link 510a and/or to the game console 502 via the communication link 512a. In instances where the game controller sensitivity information is communicated from the sensitivity controller 504d to the game console 502, the game console 502 may be operable to communicate the received game controller sensitivity information to the controller sensitivity module 508a, which may adjust the sensitivity of the game controller 508 accordingly.

The game controller 508 may comprise suitable logic, circuitry interfaces and/or code that may enable a player to engage in game play and manipulate the listener's main character. In this regard, the game controller 508 may be operable to communicate with the headset 504 via the communication link 510a in order to control information as well as game controller sensitivity information.

The controller sensitivity module 508a may comprise suitable logic, interfaces and/or code that may enable the game controller 508 to receive game controller sensitivity information from the sensitivity controller 504d in the headset 504. In an exemplary embodiment of the disclosure, the controller sensitivity module 508a may be operable to communicate with the sensitivity controller 504d in order to acquire game controller sensitivity information for sounds that are detected by the audio processor 504a during the game play. The controller sensitivity module 508a may be enabled to utilize the received game controller sensitivity information to adjust the sensitivity of the game controller 508 during the game play. The controller sensitivity module 508a may also be operable to dynamically receive updated game controller sensitivity information for detected sounds from the sensitivity controller 504d and accordingly update the corresponding sensitivity of the game controller 508.

In operation, the audio processor 504a may be operable to monitor the plurality of channels of game and/or chat audio from the game console 502. In this regard, the audio processor 504a may be operable to perform signal analysis on each of the plurality of received audio channels to determine the characteristics of sounds in the game and/or chat audio. The sensitivity controller 504d may be operable to determine game controller sensitivity information that may be utilized to adjust the game controller 508 to a particular level of sensitivity based on the detected characteristics and based on information in the sounds database 504c. The sensitivity controller 504d may be operable to communicate the game controller sensitivity information to the controller sensitivity module 508a via, for example, the communication link 510a. The controller sensitivity module 508a may adjust the sensitivity of the game controller 508 based on the game controller sensitivity information that is received from the controller sensitivity module 508a. The headset 504 may also be operable to communicate the game controller sensitivity information from the sensitivity controller 504d to the game console 502 via for example, the communication link 512a. The game console 502 may be operable to communicate the game controller sensitivity information that is received from the sensitivity controller 504d to the controller sensitivity module 508a via the communication link 512b. In some embodiments of the disclosure, the basestation 300 may be operable to communicate game controller sensitivity information from the game headset 504 to the game controller 508.

Figure 6:
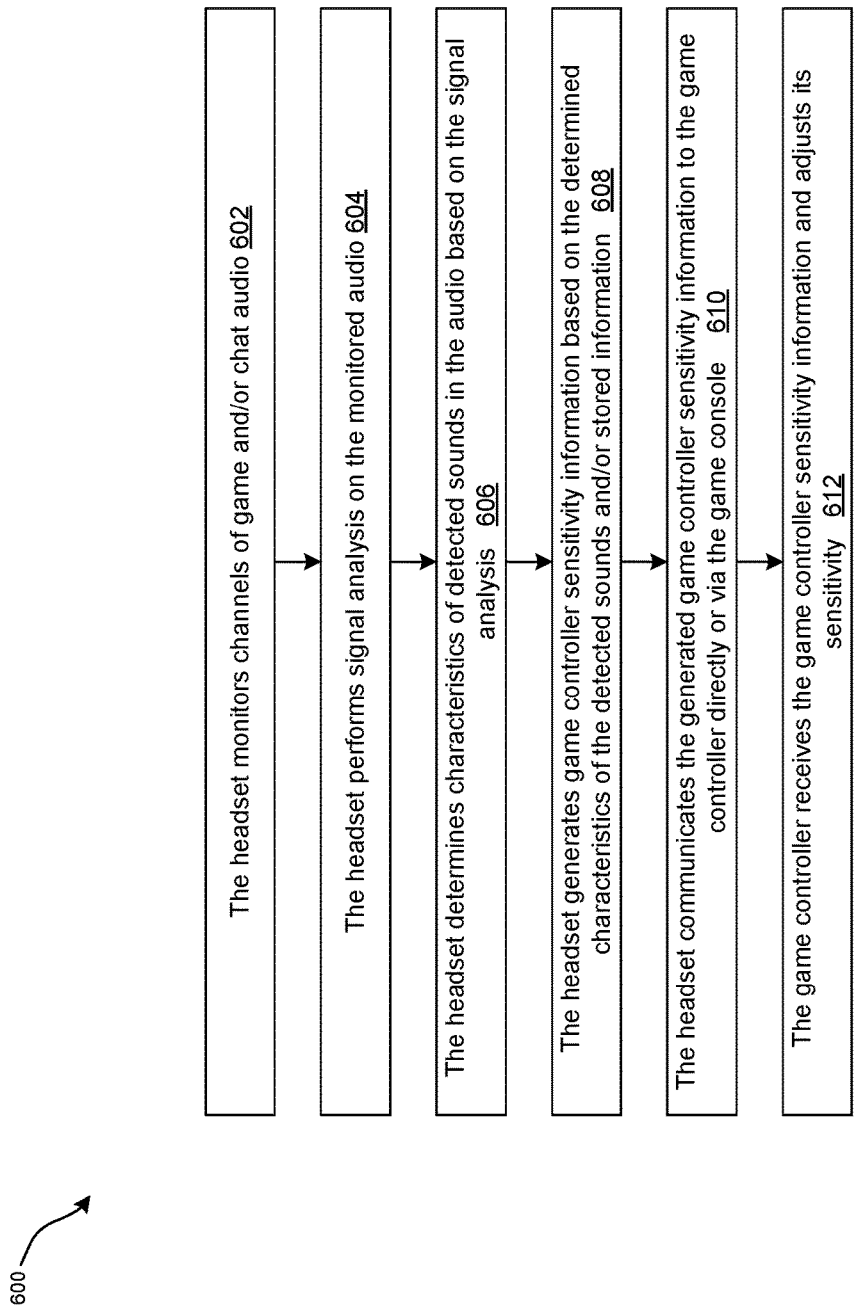
FIG. 6 is a flow diagram illustrating exemplary steps for providing dynamic control of game controller sensitivity based on audio analysis, in accordance with various exemplary embodiments of the disclosure.

FIG. 6 is a flow diagram illustrating exemplary steps for providing dynamic control of game controller sensitivity based on audio analysis, in accordance with various exemplary embodiments of the disclosure. Referring to FIG. 6, there is shown a flow chart 600 comprising a plurality of exemplary steps, namely, 602 through 612. In step 602, the headset channels of game and/or chat audio during game play. In step 604, the headset performs signal analysis on the monitored audio. In step 606, the headset determines characteristics of detected sounds in the monitored audio based on the signal analysis. In step 608, the headset generates game controller sensitivity information based on the determined characteristics of the detected sounds and/or stored information (e.g., in a look-up table and/or sounds database). In step 610, the headset communicates the generated game controller sensitivity information to the game controller directly or via the game console. In step 612, the game controller receives the game controller sensitivity information and adjusts its sensitivity.

Figure 7:
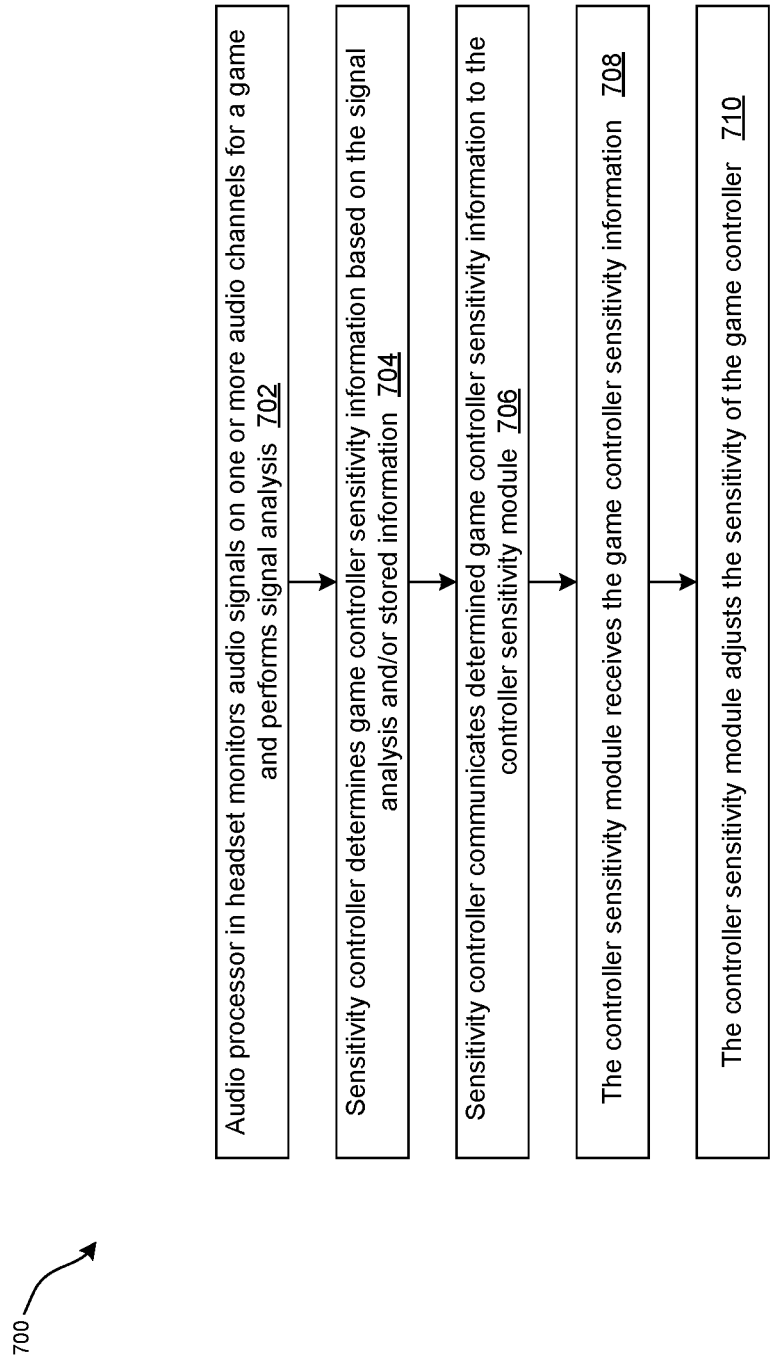
FIG. 7 is a flow diagram illustrating exemplary steps for providing dynamic control of game controller sensitivity based on audio analysis, in accordance with various exemplary embodiments of the disclosure.

FIG. 7 is a flow diagram illustrating exemplary steps for providing dynamic control of game controller sensitivity based on audio analysis, in accordance with various exemplary embodiments of the disclosure. Referring to FIG. 7, there is shown a flow chart 700 comprising a plurality of exemplary steps, namely, 702 through 710. In step 702, the audio processor in the headset monitors channels of game and/or chat audio and performs signal analysis on the audio.

In step 704, the sensitivity controller 504d determines game controller sensitivity information based on the signal analysis and/or stored information. In step 706, the sensitivity controller 504d communicates determined game controller sensitivity information to the controller sensitivity module. In step 708, the controller sensitivity module receives the game controller sensitivity information. In step 710, the controller sensitivity module adjusts the sensitivity of the game controller.

An electronic device (e.g., headset 200 and/or basestation 300) may receive a plurality of channels of game and/or chat audio during play of a game. The electronic device may detect one or more sounds on one or more of the audio channels during the monitoring of the plurality of audio channels. The electronic device may control, based on the detected one or more sounds, operation of a game controller (e.g., 102) that interacts with the game during play. The controlling of the operation of the game controller may comprise adjusting sensitivity of the game controller. The electronic device may determine directionality of the detected one or more sounds and adjust the sensitivity of the game controller based on the determined directionality of the detected one or more sounds. The electronic device may increase and/or decrease the sensitivity of the game controller in response to changes in the determined directionality of the detected one or more sounds. The electronic device may perform signal analysis on the plurality of channels. The electronic device may determine characteristics of the detected one or more sounds based on the signal analysis. The electronic device may adjust the sensitivity of the game controller based on the determined characteristics of the detected one or more sounds. The electronic device may increase and/or decrease the sensitivity of the game controller in response to changes in the determined characteristics of the detected one or more sounds. The electronic device may perform the increase and/or decrease of the sensitivity of the game controller dynamically (e.g., during game play while concurrently processing audio) and/or adaptively (e.g., based on feedback such as from the game controller and/or the game console (e.g., 176) on which the game is being played).

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:
    a game headset with circuitry that is operable to:
        analyze audio received from a gaming console; and
        adjust, based on said analysis of said audio received from said gaming console, sensitivity of a game controller coupled to said gaming console.

2. The system of claim 1, wherein said analysis comprises a determination of directionality of a sound in said received audio.

3. The system of claim 2, wherein said adjustment of said sensitivity of said game controller comprises:
    setting of said sensitivity of said controller to a higher level when said directionality indicates a source of said sound is behind said game player's character; and
    setting of said sensitivity of said controller to a lower level when said directionality indicates said source of said sound is in front of said game player's character.

4. The system of claim 2, wherein said adjustment of said sensitivity of said game controller comprises:
    an increase of said sensitivity of said controller as said directionality indicates a source of said sounds is getting further from a game player's character; and
    a decrease of said sensitivity of said controller as said directionality indicates said source of said sounds is getting closer to said game player's character.

5. The system of claim 2, wherein said adjustment of said sensitivity of said game controller comprises:
an increase of said sensitivity of said controller as said directionality indicates a source of said sounds is getting further from centered in front of a game player's character; and
a decrease of said sensitivity of said controller as said directionality indicates said source of said sounds is getting closer to centered in front of said game player's character.

6. The system of claim 1, wherein said analysis comprises a determination of one or more of: a pitch, a tone, and a frequency present in said received audio.

7. The system of claim 1, wherein said analysis comprises a determination of intensity of said received audio.

8. The system of claim 1, wherein:
said analysis comprises a determination of a speed of a source of a sound in said received audio; and
said sensitivity of said game controller is adjusted to track said speed of said source of said sound.

9. The system of claim 1, wherein said circuitry is operable to communicate with said game controller directly or via said game console.

10. The system of claim 1, wherein circuitry is operable to adjust said sensitivity of said game controller dynamically while said game controller is in use.

11. A method comprising:
analyzing, by circuitry in a game headset, audio received from a gaming console; and
adjusting, by said circuitry based on said analysis of said audio received from said gaming console, sensitivity of a game controller coupled to said gaming console.

12. The method of claim 11, wherein said analysis comprises a determination of directionality of a sound in said received audio.

13. The method of claim 12, wherein said adjusting said sensitivity of said game controller comprises:
setting said sensitivity of said controller to a higher level when said directionality indicates a source of said sound is behind a game player's character; and
setting said sensitivity of said controller to a lower level when said directionality indicates said source of said sound is in front of said game player's character.

14. The method of claim 12, wherein said adjusting said sensitivity of said game controller comprises:
increasing said sensitivity of said controller as said directionality indicates a source of said sounds is getting further from a game player's character; and
decreasing said sensitivity of said controller as said directionality indicates said source of said sounds is getting closer to said game player's character.

15. The method of claim 12, wherein said adjusting said sensitivity of said game controller comprises:
increasing said sensitivity of said controller as said directionality indicates a source of said sounds is getting further from centered in front of a game player's character; and
decreasing said sensitivity of said controller as said directionality indicates said source of said sounds is getting closer to centered in front of said game player's character.

16. The method of claim 11, wherein said performing said analysis comprises determining one or more of: a pitch, a tone, and a frequency present in said received audio.

17. The method of claim 11, wherein said performing said analysis comprises determining intensity of said received audio.

18. The method of claim 11, wherein:
said performing said analysis comprises determining a speed of a source of a sound in said received audio; and
adjusting said sensitivity of said game controller to track said speed of said source of said sound.

19. The method of claim 11, wherein said circuitry communicates with said game controller directly or via said game console.

20. The system of claim 11, wherein said adjusting said sensitivity of said game controller occurs dynamically while said game controller is in use.

21. A system comprising:
a game headset with circuitry that is operable to:
analyze received audio relating to a video game; and
adjust, based on said analysis of said received audio, sensitivity of a game controller coupled to a gaming console.

22. The system of claim 21, wherein said analysis comprises a determination of directionality of a sound in said received audio.

23. The system of claim 22, wherein said adjustment of said sensitivity of said game controller comprises:
setting of said sensitivity of said controller to a higher level when said directionality indicates a source of said sound is behind a game player's character; and
setting of said sensitivity of said controller to a lower level when said directionality indicates said source of said sound is in front of a game player's character.

24. The system of claim 22, wherein said adjustment of said sensitivity of said game controller comprises:
an increase of said sensitivity of said controller as said directionality indicates a source of said sounds is getting further from a game player's character; and
a decrease of said sensitivity of said controller as said directionality indicates said source of said sounds is getting closer to a game player's character.

25. The system of claim 22, wherein said adjustment of said sensitivity of said game controller comprises:
an increase of said sensitivity of said controller as said directionality indicates a source of said sounds is getting further from centered in front of a game player's character; and
a decrease of said sensitivity of said controller as said directionality indicates said source of said sounds is getting closer to centered in front of said game player's character.

26. The system of claim 21, wherein said analysis comprises a determination of one or more of: a pitch, a tone, and a frequency present in said received audio.

27. The system of claim 21, wherein said analysis comprises a determination of intensity of said received audio.

28. The system of claim 21, wherein:
said analysis comprises a determination of a speed of a source of a sound in said received audio; and
said sensitivity of said game controller is adjusted to track said speed of said source of said sound.

29. The system of claim 21, wherein said circuitry is operable to communicate with said game controller directly or via said game console.

30. The system of claim 21, wherein circuitry is operable to adjust said sensitivity of said game controller dynamically while said game controller is in use.

31. A method comprising:
analyzing, by circuitry in a game headset, received audio relating to a video game; and adjusting, by said circuitry based on said analysis of said received audio, sensitivity of a game controller coupled to a gaming console.

32. The method of claim 31, wherein said analysis comprises a determination of directionality of a sound in said received audio.

33. The method of claim 32, wherein said adjusting said sensitivity of said game controller comprises:
   setting said sensitivity of said controller to a higher level when said directionality indicates a source of said sound is behind a game player's character; and
   setting said sensitivity of said controller to a lower level when said directionality indicates said source of said sound is in front of a game player's character.

34. The method of claim 32, wherein said adjusting said sensitivity of said game controller comprises:
   increasing said sensitivity of said controller as said directionality indicates a source of said sounds is getting further from a game player's character; and
   decreasing said sensitivity of said controller as said directionality indicates said source of said sounds is getting closer to a game player's character.

35. The method of claim 32, wherein said adjusting said sensitivity of said game controller comprises:
   increasing said sensitivity of said controller as said directionality indicates a source of said sounds is getting further from centered in front of a game player's character; and
   decreasing said sensitivity of said controller as said directionality indicates said source of said sounds is getting closer to centered in front of said game player's character.

36. The method of claim 31, wherein said performing said analysis comprises determining one or more of: a pitch, a tone, and a frequency present in said received audio.

37. The method of claim 31, wherein said performing said analysis comprises determining intensity of said received audio.

38. The method of claim 31, wherein:
   said performing said analysis comprises determining a speed of a source of a sound in said received audio; and
   adjusting said sensitivity of said game controller to track said speed of said source of said sound.

39. The method of claim 31, wherein said circuitry communicates with said game controller directly or via said game console.

40. The system of claim 31, wherein said adjusting said sensitivity of said game controller occurs dynamically while said game controller is in use.

* * * * *